No. 817,891. PATENTED APR. 17, 1906.
M. ALTSTOCK.
HALM PLUCKING MECHANISM FOR POTATO DIGGING MACHINES.
APPLICATION FILED NOV. 30, 1904.
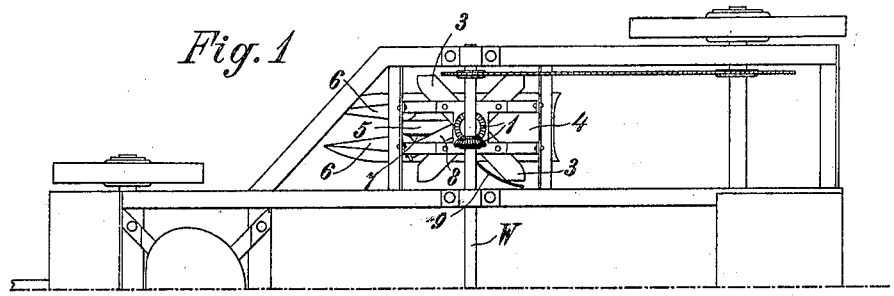
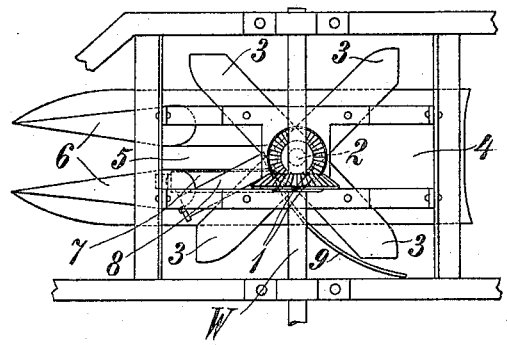
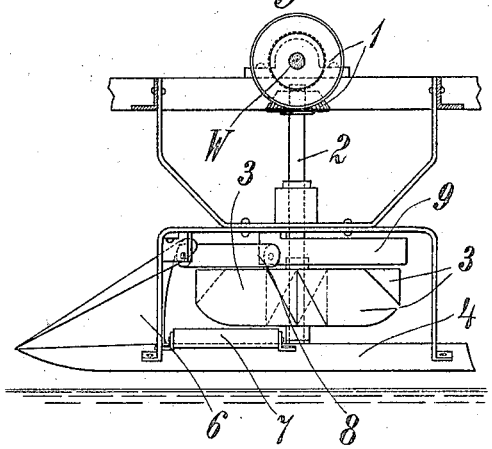
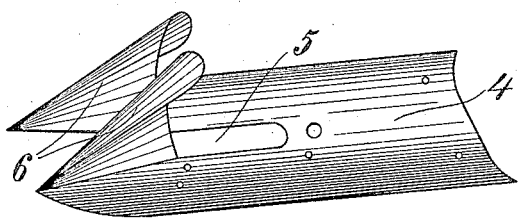
Witnesses.
Inventor
Marcus Altstock
by B. Singer
atty

UNITED STATES PATENT OFFICE.

MARCUS ALTSTOCK, OF LEMBERG, AUSTRIA-HUNGARY.

HALM-PLUCKING MECHANISM FOR POTATO-DIGGING MACHINES.

No. 817,891.     Specification of Letters Patent.     Patented April 17, 1906.

Application filed November 30, 1904. Serial No. 234,948.

*To all whom it may concern:*

Be it known that I, MARCUS ALTSTOCK, a subject of the Emperor of Austria-Hungary, residing in 17 Turmanská, Lemberg, Galicia, Austria-Hungary, have invented a new and useful Improvement in Halm-Plucking Mechanism for Potato-Digging Machines, of which the following is a specification.

This invention relates to halm-plucking mechanism for potato-harvesting machines, consisting of revoluble cross-arms adapted to first grip and then pluck the halms.

The invention is shown in connection with a potato-harvesting machine, and in the accompanying drawings, Figure 1 is a plan view of a potato-digging machine, showing the device of my invention in connection therewith; Fig. 2, a detached plan view of the device of my invention; Fig. 3, a side view thereof; Fig. 4, a perspective view of the guard and feed plate.

The halm-removing device is arranged at the side of the lifting device and is operated from the main shaft of the potato-digging machine by means of a pair of bevel-wheels 1. It consists of a plurality—in the present instance four—of plucking-arms 3, mounted on a vertical shaft 2, operated by the said bevel-gear. Beneath these arms a guard and feed plate 4 is arranged, provided with a slot 5, extending approximately to the middle thereof, the side edges forming downwardly-bent flaps 6. In cross-section it is in the form of a flat arc. A horizontal pressing-roller 7 is so arranged within the guard-plate and the plucking-arms that its inner generating-line lies approximately on the inner slot edge in the direction of rotation of the arms. A second roller 8, which is also horizontal, but lies at an angle to the edges of the slot, is mounted close above the arms, connecting with this roller a scraping strip or plate 9, leading to one side of the machine. When the machine is in motion, the halms pass within the guard or feed plate 4, are gripped by the arms 3 and pressed on the roller, and then upon further movement are drawn off and conveyed to the scraper 9, by which they are thrown out laterally onto the ground.

Having thus described my invention, what I claim is—

1. In halm-plucking mechanism for potato-digging machines the combination of a plurality of plucking-arms mounted on a vertical shaft, driven by bevel-wheels, from the main shaft of the potato-digging machine and horizontal pressing-rollers near above and below the arms substantially as described.

2. In combination with the plucking-arms and pressing-rollers a guard and feed plate arranged below the lower rollers provided with a slot extending to the middle the edges of the plate forming downwardly-bent flaps, and connecting with the upper roller and a scraping-strip leading to the outside substantially as described.

In testimony whereof I affix my signature in presence of two witnesses.

MARCUS ALTSTOCK.

Witnesses:
   ALVESTO S. HOGUE,
   FOG IGNAZ KNOPFCHNACHER.